(12) United States Patent
Seregin et al.

(10) Patent No.: US 8,139,879 B2
(45) Date of Patent: Mar. 20, 2012

(54) METHOD AND APPARATUS FOR ENCODING IMAGE BY EXPONENTIAL GOLOMB BINARIZATION USING OPTIMAL THRESHOLD, AND METHOD AND APPARATUS FOR DECODING IMAGE BY EXPONENTIAL GOLOMB BINARIZATION USING OPTIMAL THRESHOLD

(75) Inventors: Vadim Seregin, Suwon-si (KR); Alexander Alshin, Suwon-si (KR); Maxim Koroteev, Suwon-si (KR); Elena Alshina, Suwon-si (KR); Ekaterina Nesterova, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 917 days.

(21) Appl. No.: 12/173,069

(22) Filed: Jul. 15, 2008

(65) Prior Publication Data

US 2009/0097768 A1     Apr. 16, 2009

(30) Foreign Application Priority Data

Oct. 15, 2007    (KR) ................. 10-2007-0103724

(51) Int. Cl.
   *G06K 9/46*     (2006.01)
(52) U.S. Cl. ......... 382/239; 382/232; 382/244; 382/246
(58) Field of Classification Search .............. None
   See application file for complete search history.

(56) References Cited

U.S. PATENT DOCUMENTS

| | | | |
|---|---|---|---|
| 5,764,374 A * | 6/1998 | Seroussi et al. | 382/244 |
| 6,441,755 B1 | 8/2002 | Dietz et al. | |
| 7,062,099 B2 | 6/2006 | Li et al. | |
| 7,454,073 B2 * | 11/2008 | Chen et al. | 382/239 |
| 7,860,160 B2 * | 12/2010 | Shimazaki et al. | 375/240.03 |
| 2004/0008769 A1 | 1/2004 | Winger | |
| 2006/0050789 A1 | 3/2006 | Gisquet et al. | |
| 2006/0262858 A1 | 11/2006 | Ishikawa | |

OTHER PUBLICATIONS

"H.264 Advanced Video Coding for Generic Audiovisual Services", May 2003, International Telecommunication Union, p. 13.*

* cited by examiner

*Primary Examiner* — Jason M Repko
*Assistant Examiner* — David F Dunphy
(74) *Attorney, Agent, or Firm* — Sughrue Mion, PLLC (57) ABSTRACT

A method and apparatus for coding an image by using exponential Golomb binarization are provided. The method comprises: performing entropy coding on an input image by performing exponential Golomb binarization using a plurality of predetermined thresholds; measuring a bit rate of a bit stream which is generated by performing the entropy coding using each threshold; and determining an optimal threshold by comparing bit rates with regard to the thresholds.

17 Claims, 7 Drawing Sheets

METHOD AND APPARATUS FOR ENCODING IMAGE BY EXPONENTIAL GOLOMB BINARIZATION USING OPTIMAL THRESHOLD, AND METHOD AND APPARATUS FOR DECODING IMAGE BY EXPONENTIAL GOLOMB BINARIZATION USING OPTIMAL THRESHOLD

CROSS-REFERENCE TO RELATED PATENT APPLICATIONS

This application claims the priority from Korean Patent Application No. 10-2007-0103724, filed on Oct. 15, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to encoding an image, and decoding an image, and more particularly, to encoding an image which has an optimal bit rate by performing optimal entropy coding, and decoding the image.

2. Description of the Related Art

Image compression standards include entropy coding. Hereinafter, the entropy encoding of the related art H.264 standard will be described with reference to FIG. 1.

Figure 1:
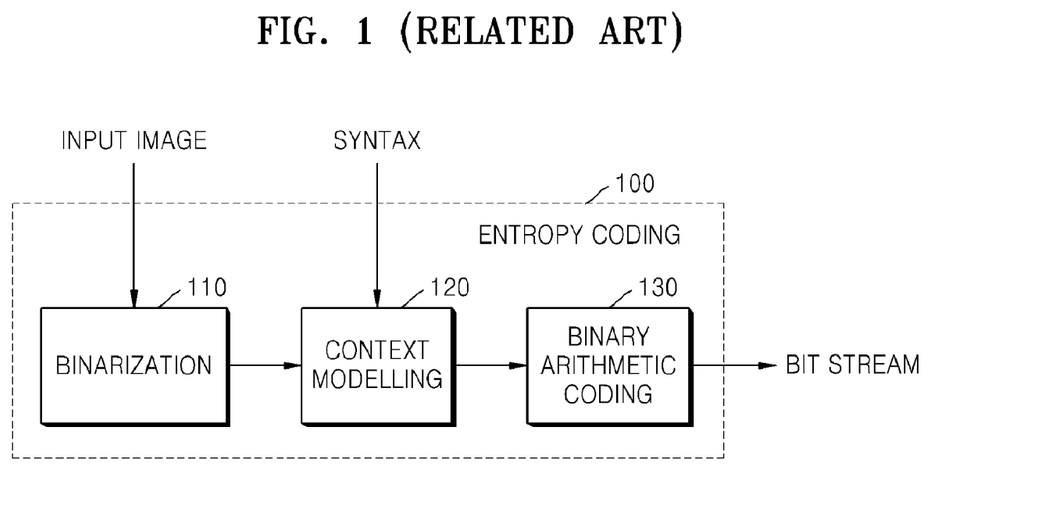
FIG. 1 is a flowchart illustrating entropy encoding.

FIG. 1 is a flowchart illustrating entropy encoding. The entropy encoding 100 of the related art H.264 standard comprises three steps; binarization 110, context modeling 120, and binary arithmetic coding 130.

In the binarization 110, an absolute value of a quantized discrete cosine transform DCT coefficient is converted into binary bit stream which consists of 0 and/or 1.

In the context modeling 120, in order to encode information related to a macroblock which is called syntax, context indexes, that is, syntax and binary values, are received.

In the binary arithmetic coding 130, a probability section is repeatedly divided according to a probability of individual symbols. A bit stream, which is generated by entropy coding and the binary arithmetic coding, is output.

Figure 2:
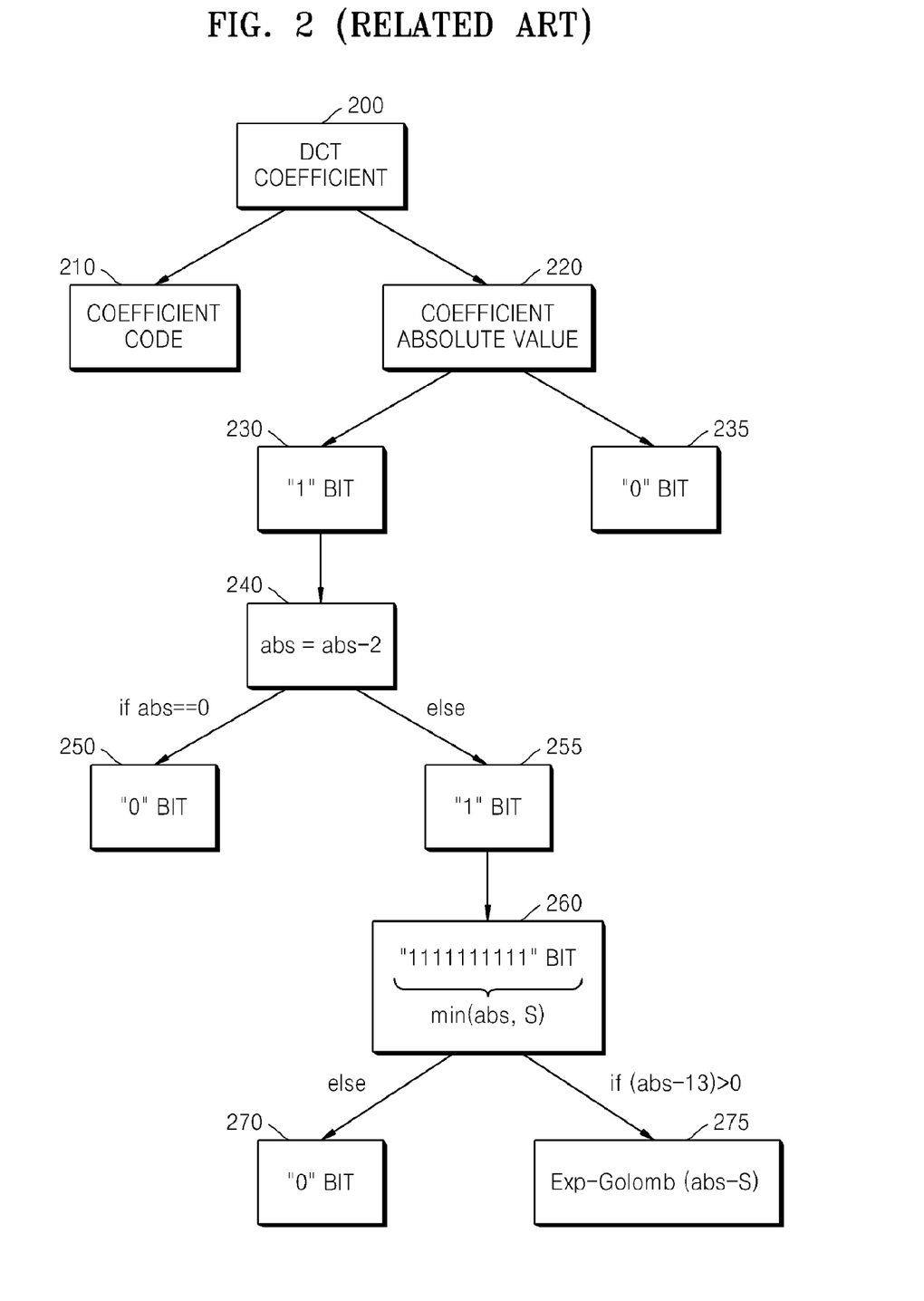
FIG. 2 shows procedures of binarization according to a magnitude coding scheme.

FIG. 2 shows procedures of binarization according to a magnitude coding scheme.

A quantized DCT coefficient 200 includes a coefficient code 210 and a coefficient absolute value 220. A unary code of context-based adaptive arithmetic coding (CABAC) consists of either "1" bits or "0" bits. A truncated unary code is larger than 0 or smaller than a threshold, and is defined only by the same quantized DCT coefficient. A quantized DCT coefficient which is smaller than a threshold is represented by a unary code, and a quantized DCT coefficient which is equal to a threshold is represented only by a "1" bit by ignoring a "0" bit.

When the coefficient absolute value abs or 220 is larger than 1, a "1" bit is assigned (230), or otherwise, a "0" bit is assigned (235). When the coefficient absolute value is larger than 1, a value obtained by subtracting 2 from the coefficient absolute value is updated as an absolute value abs (240). When the updated coefficient absolute value abs (hereinafter, this will be referred to as a coefficient absolute value) is 0, a "0" bit is assigned (250), or otherwise, a "1" bit is assigned (255). When the coefficient absolute value abs consists of "1" bits (260), a "0" bit is assigned if the coefficient absolute value is not larger than a threshold, or otherwise, exponential Golomb binarization is performed on a value (abs-s) obtained by subtracting the threshold from the coefficient absolute value.

In the entropy coding by using binarization using related art binary Golomb coding, a threshold S is fixed, and the coding depends on a compression data format. However, in a high bit rate environment, the fixed threshold is not appropriate.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides methods and apparatuses for encoding and decoding an image by performing entropy coding using exponential Golomb binarization, which can be optimally performed by determining an optimal threshold for exponential Golomb binarization which is adaptive to image data.

According to an aspect of the present invention, there is provided a method of encoding an image using exponential Golomb coding, the method comprising: performing entropy coding on an input image by exponential Golomb binarization using a plurality of predetermined thresholds; measuring a bit rate of a bit stream which is generated by performing the entropy coding using each threshold; and determining an optimal threshold by comparing bit rates with regard to the thresholds.

The method may further comprise outputting a bit stream which is generated by performing the entropy coding by exponential Golomb binarization using the determined optimal threshold.

The method may further comprise transmitting the determined optimal threshold together with the output bit stream.

The determining of the optimal threshold may include determining a threshold which has the smallest bit rate from among the thresholds when a same quantization parameter is applied, and the thresholds may be determined for individual frames or individual blocks in each frame.

The threshold may be applied to data of at least one of the formats including luma, chroma, intra mode, and inter mode.

The performing of entropy coding may include binarization, context modeling and binary arithmetic coding.

According to another aspect of the present invention, there is provided an apparatus for encoding an image by using exponential Golomb coding, the apparatus comprising: a circular coding unit which performs entropy coding on an input image by using exponential Golomb binarization using a plurality of predetermined thresholds; a bit rate measuring unit which measures a bit rate of a bit stream generated by performing the entropy coding using each threshold; and an optimal threshold determining unit which determines an optimal threshold by comparing the bit rates with regard to the thresholds.

The apparatus may further comprise a bit stream output unit which outputs a bit stream generated by performing the entropy coding by exponential Golomb binarization using the determined optimal threshold.

The apparatus may further comprise a threshold transmitting unit which transmits the determined optimal threshold together with the output bit stream.

According to another aspect of the present invention, there is provided a method of decoding an image by performing entropy decoding by exponential Golomb binarization using a plurality of predetermined thresholds, the method comprising: receiving threshold information for exponential Golomb binarization, together with an image bit stream; and performing entropy decoding by using exponential Golomb coding using the threshold information, wherein the threshold information includes at least one of a plurality of predetermined thresholds which are used for entropy coding an input image using exponential Golomb binarization in the course of coding the image bit stream.

In the performing of the entropy decoding, thresholds which corresponds to individual frames or individual blocks in each frame may be used.

In the performing of the entropy decoding, a threshold which corresponds to data of at least one of formats including luma, chroma, intra mode, and inter mode may be used.

According to another aspect of the present invention, there is provided an apparatus for decoding an image by performing entropy decoding by exponential Golomb binarization using a plurality of predetermined thresholds, the apparatus comprising: a receiving unit which receives threshold information for exponential Golomb binarization together with an image bit stream; and an entropy decoding unit which performs entropy decoding by using exponential Golomb binarization using the threshold information, wherein the threshold information includes at least one of a plurality of predetermined thresholds which are used for entropy coding an input image using exponential Golomb binarization in the course of coding the image bit stream.

According to another aspect of the present invention, there is provided an image stream including: a threshold for exponential Golomb binarization used for entropy coding of data in a payload region, wherein when the data in the payload region refers to at least one of data units including a frame or a block in a frame, luma, chroma, intra mode and inter mode, the threshold is for the data in the payload area.

According to another aspect of the present invention, there is provided a computer readable recording medium having embodied thereon a computer program for executing the image coding method.

According to another aspect of the present invention, there is provided a computer readable recording medium having embodied thereon a computer program for executing the image decoding method.

According to the present invention, thresholds for exponential Golomb binarization are determined for individual frames or individual blocks in each frame, and thus more improved gain can be obtained, compared to the related art coding scheme, in a high bit rate environment.

Since a frame division scheme for optimal threshold determination can be flexibly selected, the improved gain becomes greater as the frame division becomes more detailed. The threshold can be determined regardless of a frame format such as luma, chroma, intra mode, and inter mode, as well as the frame division.

Moreover, since an optimal threshold generated in the course of coding is transmitted with an image bit stream, efficient entropy decoding can be performed when an image is reconstructed.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

An image encoding method by using entropy encoding using thresholds of exponential Golomb binarization which is determined according to an exemplary embodiment of the present invention and an apparatus of the image encoding method, and an image decoding method by using the entropy encoding using the thresholds and an apparatus of the image decoding method will now be described with reference to FIGS. 3 to 11.

Figure 3:
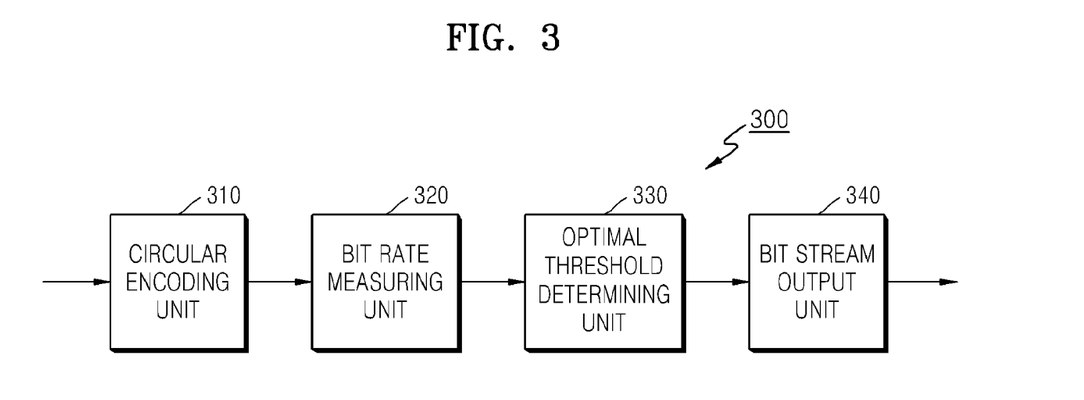
FIG. 3 is a block diagram of an image encoding apparatus according to an exemplary embodiment of the present invention.

FIG. 3 is a block diagram of an image encoding apparatus 300 according to an exemplary embodiment of the present invention. The image encoding apparatus 300 includes a circular encoding unit 310, a bit rate measuring unit 320, an optimal threshold determining unit 330, and a bit stream output unit 340.

The circular encoding unit 310 receives an input image, and performs entropy coding on the input image by using exponential Colomb binarization for an absolute value of an input DCT coefficient by using various predetermined thresholds. Then, the circular encoding unit 310 outputs bit streams generated for individual thresholds to the bit rate measuring unit 320.

Although not illustrated in drawings, the image input to the circular encoding unit 310 may be a quantized DCT coefficient which is obtained by performing DCT on input image data and quantizing the transformed DCT coefficient.

The entropy encoding includes the steps of binarization, context modelling, and binary arithmetic coding.

According to the current exemplary embodiment of the present invention, thresholds of all blocks in all frames or individual frames are determined. The blocks include macro blocks of various sizes. With regard to data of at least one of formats including luma, chroma, an intra mode, and an inter mode, thresholds which are respectively adaptive to data may be determined.

The bit rate measuring unit 320 receives the bit streams from the circular encoding unit 310, measures the bit rate of each bit stream which is generated by performing entropy coding using each threshold, and outputs the measured bit rates according to individual thresholds to the optimal threshold determining unit 330.

The optimal threshold determining unit 330 receives the bit rates from the bit rate measuring unit 320, determines the optimal threshold among a plurality of thresholds by comparing the bit rates of a plurality of bit streams generated using the thresholds, and outputs the determined optimal threshold to the bit stream output unit 340.

The optimal threshold determined by the optimal threshold determining unit 330 is a threshold which generates the smallest bit rate from among bit rates of bit streams generated by performing entropy coding in which the bit streams are binarized using each threshold.

The bit stream output unit 340 receives the optimal threshold from the optimal threshold determining unit 330, and outputs the bit stream which is generated by performing the entropy coding with Golomb coding using the determined optimal threshold.

Although not illustrated in the drawings, the current exemplary embodiment includes a threshold transmitting unit to transmit the optimal threshold together with the output bit stream.

The threshold transmitting unit may transmit the optimal threshold as an overhead of image data to be transmitted. The optimal threshold may be transmitted through a channel that is different from the channel through which the image data is transmitted, or may be transmitted by storing it in a header region of the bit stream of the image data.

Figure 4:
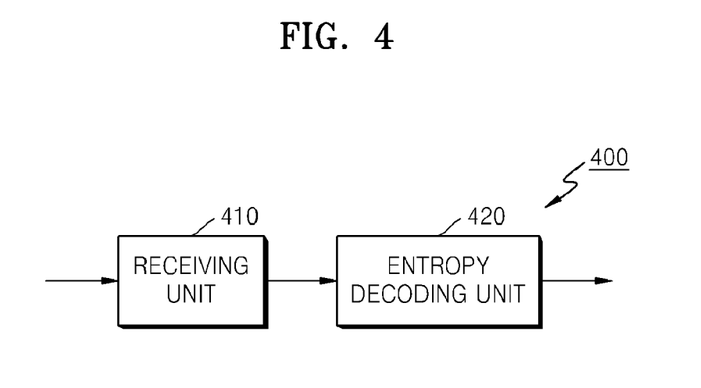
FIG. 4 is a block diagram of an image decoding apparatus according to an exemplary embodiment of the present invention.

FIG. 4 is a block diagram of an image decoding apparatus 400 according to an exemplary embodiment of the present invention. Referring to FIG. 4, the image decoding apparatus 400 includes a receiving unit 410, and an entropy decoding unit 420.

The receiving unit 410 receives thresholds related to exponential Golomb binarization, and outputs them to the entropy decoding unit 420.

According to the current exemplary embodiment, the receiving unit 410 extracts the threshold from an overhead of a bit stream. According to another exemplary embodiment, the receiving unit 410 may receive the thresholds which are transmitted through a channel that is different from the channel through which the bit streams are transmitted.

The entropy decoding unit 420 receives the threshold from the receiving unit 410, and performs entropy decoding by using exponential Golomb binarization using the received thresholds.

In the entropy decoding, thresholds which correspond to individual frames or individual blocks in each frame are used.

In the entropy decoding, an optimal threshold which corresponds to data of at least one of the formats including luma, chroma, intra mode, and inter mode is employed.

Although not illustrated in the drawings, the image decoding apparatus 400 reconstructs an image using the entropy decoded data.

Figure 5:
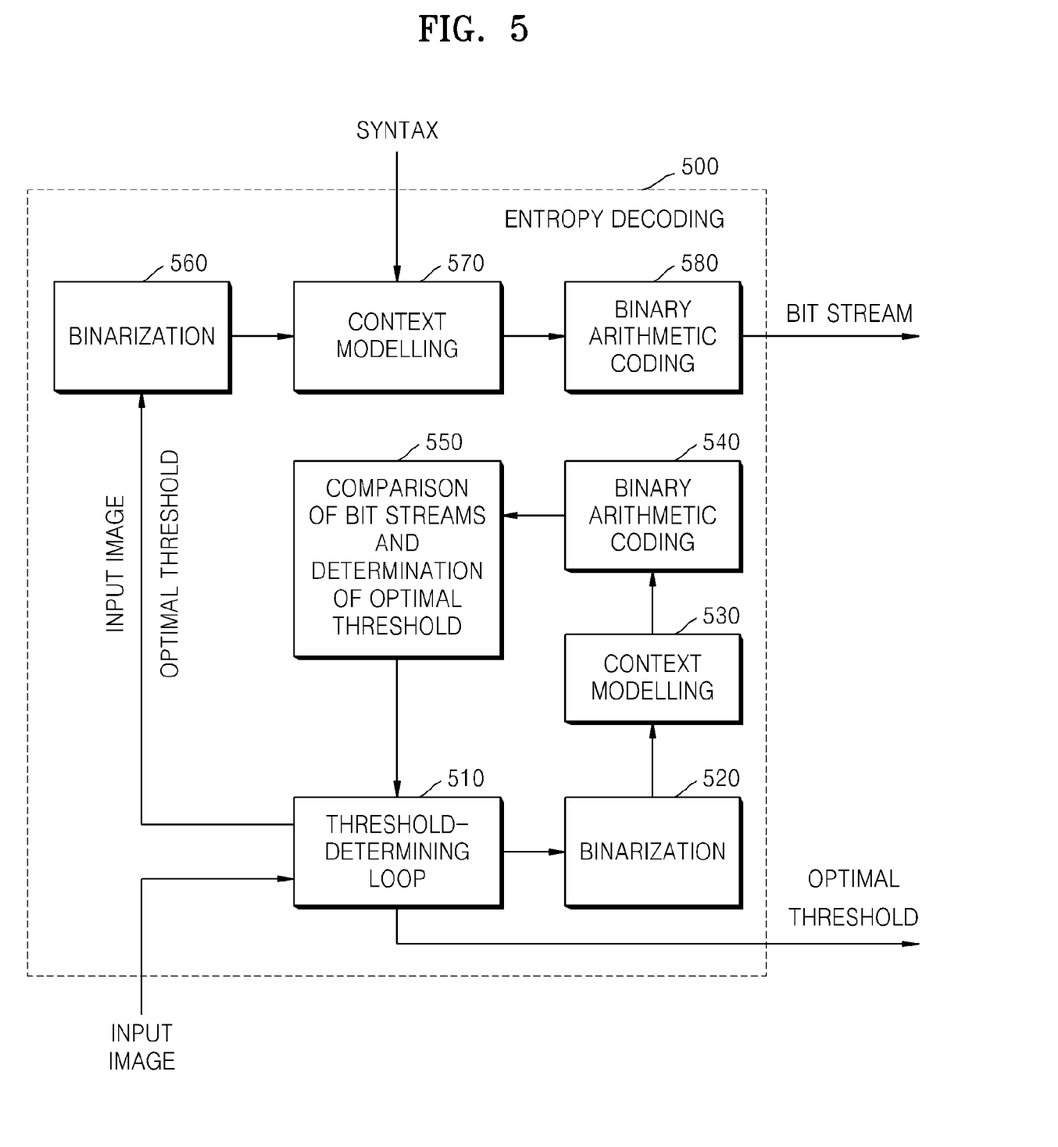
FIG. 5 illustrates a circular loop for determining thresholds.

FIG. 5 illustrates a circular loop for determining thresholds.

The image encoding apparatus 300 in FIG. 3 includes an entropy coding procedure 500 using exponential Golomb binarization using the optimal threshold.

Input image data is input to a threshold-determining loop 510. According to the current exemplary embodiment, the input image data is an absolute value of a quantized DCT coefficient of the input image. The threshold-determining loop 510 selects a threshold for the exponential Golomb binarization within a predetermined range. When the optimal threshold-determining loop is repeated, the threshold is changed within the predetermined range.

The entropy coding is performed by a binarization procedure 520 in which the exponential Golomb binarization is performed using the threshold determined by the threshold-determining loop 510, a context modelling procedure 530 and a binary arithmetic coding procedure 540. The threshold-determining loop 510 may determine optimal thresholds differently for a part of the frames, that is, each frame or each block in each frame.

A bit rate of a bit stream generated by performing the entropy coding using a predetermined threshold is measured so as to evaluate coding performance of the predetermined threshold. Furthermore, within the predetermined range, bit rates of the generated bit streams relating to more than one threshold are compared to each other, so that the optimal threshold which generates an optimal bit rate is determined (550).

The threshold-determining loop 510 outputs the optimal threshold, which is determined as a result of the entropy coding performed, with different thresholds, to a standard entropy performing procedure. That is, the optimal threshold can be applied intact to a context-based adaptive arithmetic coding (CABAC) context modelling scheme of the related art H.264 standard. Thus, the determined optimal threshold is input together with the input image data (the absolute value of the quantized DCT coefficient of the input image in the current exemplary embodiment) to a binarization procedure 560 of the standard entropy coding procedure, and is used for the exponential Golomb coding. A bit stream is entropy coded by performing the binarization procedure 560, a context modelling procedure 570 and a binary arithmetic coding procedure 580, and the entropy coded bit stream is output.

The threshold-determining loop 510 outputs the optimal threshold so as to transmit the optimal threshold together with a bit stream which is generated by standard entropy coding.

Hereinafter, with reference to FIGS. 6 to 8, results of experiments performed with the exemplary embodiments of the present invention will be described. In the experiments which will now be described, an optimal frame is determined for each frame, and only the first T frame is encoded with 8×8 macro block size mode inactivated.

Figure 6:
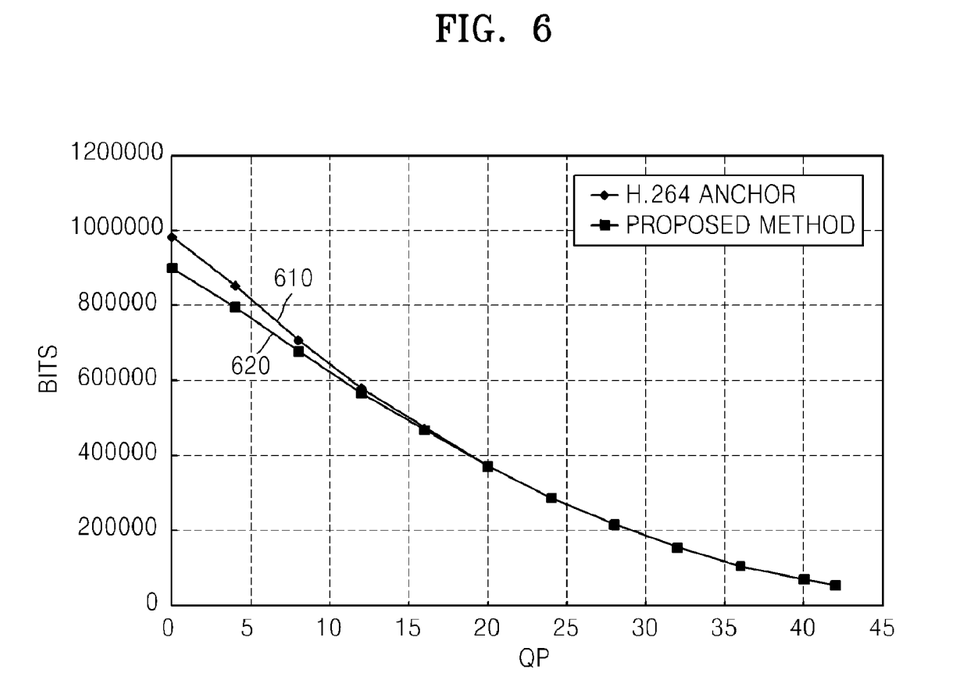
FIG. 6 is a graph showing a first experimental result of the image encoding apparatus in FIG. 3.

FIG. 6 is a graph showing a first experimental result of the image encoding apparatus 300 in FIG. 3.

Referring to FIG. 6, the horizontal axis of the graph indicates quantized parameters QP, and the vertical axis indicates bits. FIG. 6 shows a comparison between an experimental result 620 of the image encoding apparatus in FIG. 3 and a result 610 according to the related art Anchor coding scheme of the H.264 standard, with regard to a "Mobile" video sequence.

Referring to FIG. 6, the encoding result 620 of the image encoding apparatus in FIG. 3 has smaller bits than the result of the related art anchor coding 610 when the quantized parameter is smaller. Compared to the related art entropy coding, according to the exemplary embodiments of the present invention, a constant peek signal to noise ratio (PSNR) is obtained and bit streams with smaller bits are generated when the specific quantized parameter is set. Especially, when the quantized parameter is less than 10, that is, in a high bit rate, the image encoding apparatus according to the exemplary embodiments of the present invention shows an improved performance compared to the related art coding scheme.

Figure 7:
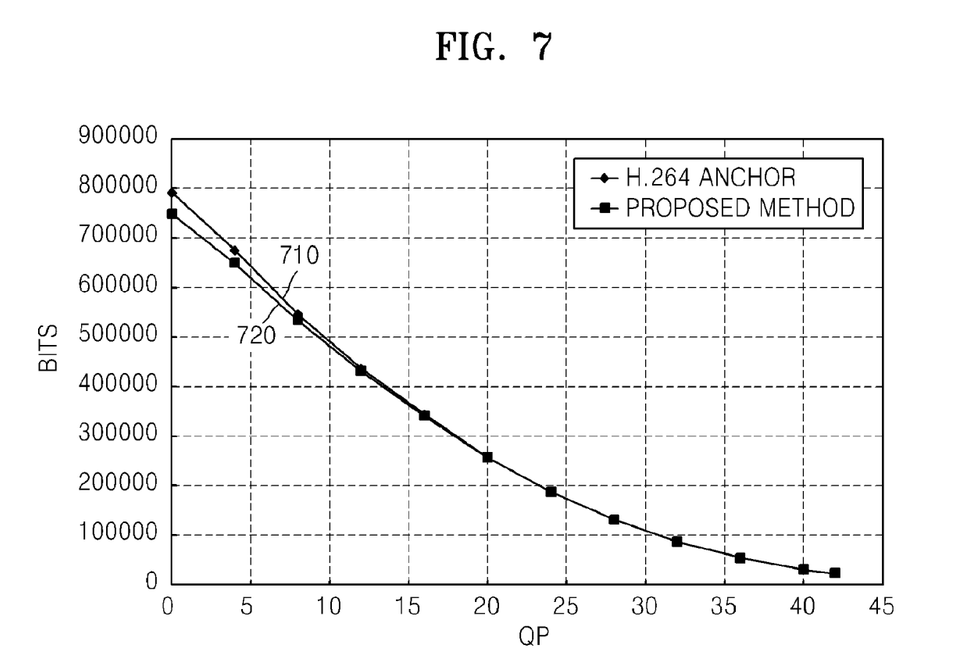
FIG. 7 is a graph showing a second experimental result of the image decoding apparatus in FIG. 4.

FIG. 7 is a graph showing a second experimental result of the image decoding apparatus 400 in FIG. 4.

Referring to FIG. 7, the horizontal axis of the graph indicates a quantization parameter, and the vertical axis indicates bits. FIG. 7 shows a comparison between an experimental result 720 of the image decoding apparatus in FIG. 4 and a result 710 according to the related art Anchor coding scheme of the H.264 standard, with regard to a "Bus" video sequence.

When the quantized parameter is less than 10, that is, in a high bit rate environment, the image encoding apparatus according to the exemplary embodiments of the present invention shows an improved performance compared to the related art coding scheme.

Figure 8:
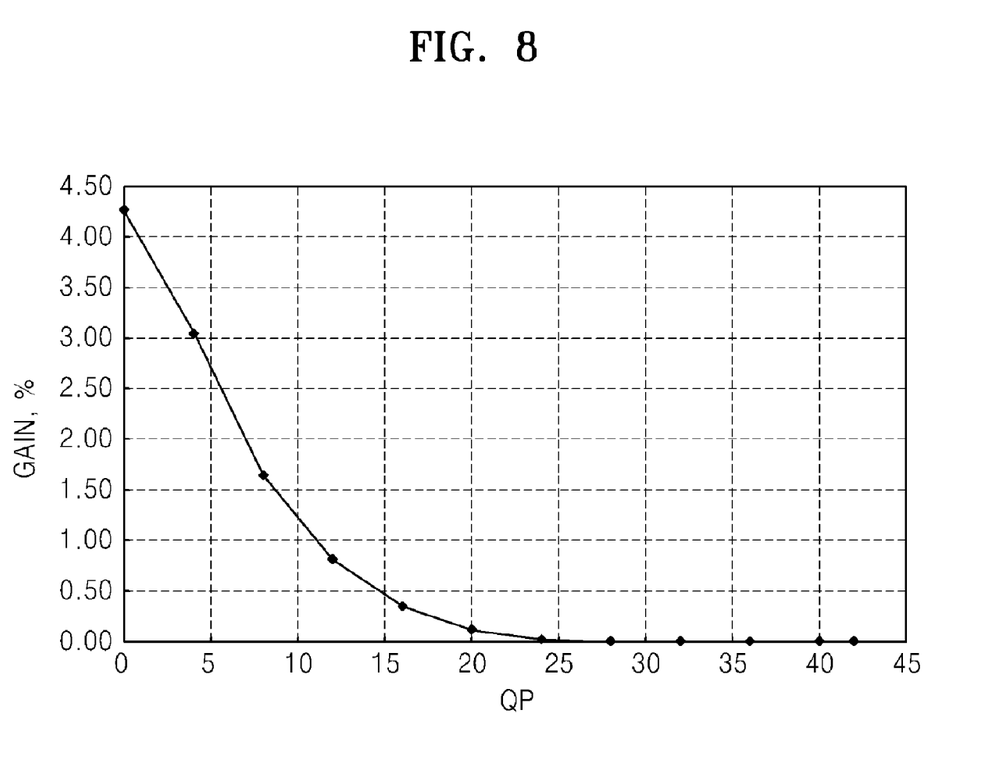
FIG. 8 is a graph showing a third experimental result of the image decoding apparatus in FIG. 4.

FIG. 8 is a graph showing a third experimental result of the image decoding apparatus 400 in FIG. 4.

The horizontal axis of the graph indicates a quantization parameter, and the vertical axis indicates percentage gain. FIG. 8 shows an average bit rate gain of the result that the image encoding method of the exemplary embodiments of the present invention obtains as compared with the result of the related art coding scheme when the image encoding method of the exemplary embodiments of the present invention is applied video sequences of "Foreman", "Mobile", "Bus", "Football", "City", "Crew", "Harbor", and "Soccer".

Referring to FIG. 8, according to the exemplary embodiment of the present invention, the image encoding apparatus obtains a larger gain when the quantization parameter is smaller, that is, when the bit rate is higher. The reason why the image encoding method according to the exemplary embodiments of the present invention can obtain an improved result when the bit rate is higher is that an absolute value of a residual to be encoded becomes larger in a high bit rate.

Figure 9:
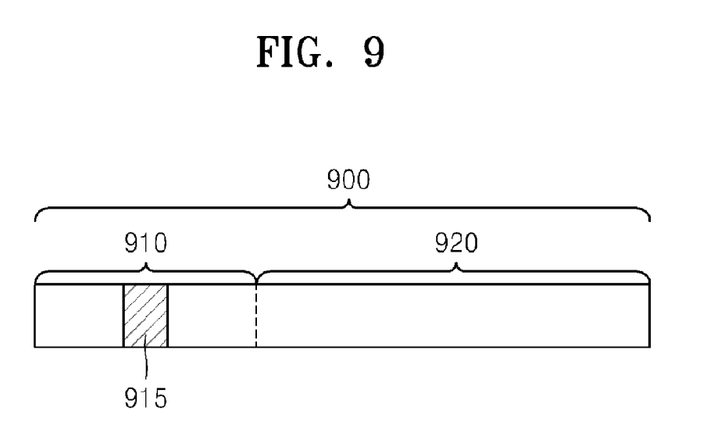
FIG. 9 illustrates an image bit stream according to an exemplary embodiment of the present invention.

FIG. 9 illustrates an image bit stream 900 according to an embodiment of the present invention. The image encoding apparatus 300 in FIG. 3 transmits the optimal threshold together with the image bit stream by using the transmitting unit 340, and the receiving unit 410 of the image decoding apparatus 400 in FIG. 4 receives the threshold and the image bit stream.

The image encoding apparatus 300 records information of the optimal threshold corresponding to data about the image which is recorded on the payload region 920 to a predetermined position 915 of a header region 910 in the image bit stream 900.

The image decoding apparatus 400 extracts the threshold from the header region 910 in the image bit stream 900 for exponential Golomb binarization.

Although the optimal threshold data is added as an overhead 915 for the image bit stream, it does not interrupt performance improvement since only few bits are assigned to the optimal threshold data in a high bit rate environment.

Figure 10:
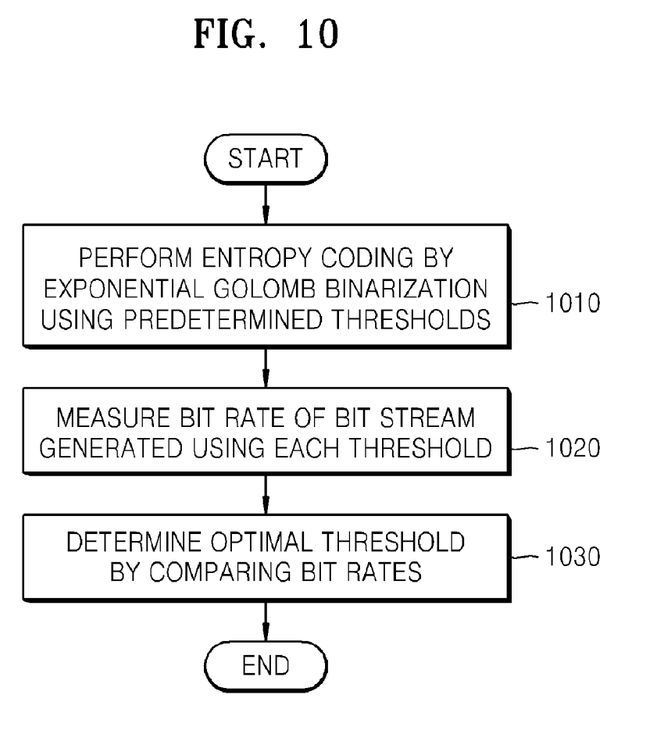
FIG. 10 is a flowchart illustrating an image encoding method according to an exemplary embodiment of the present invention.

FIG. 10 is a flowchart illustrating an image encoding method according to an exemplary embodiment of the present invention.

In operation 1010, entropy coding is performed by using exponential Golomb binarization using a plurality of thresholds.

In operation 1020, bit rates of a bit stream which are generated by performing the entropy coding using each threshold are measured.

In operation 1030, an optimal threshold which has the smallest bit rate is determined by comparing the bit rates with respect to the thresholds.

According to the exemplary embodiment of the present invention, a bit stream, which is generated by performing the entropy coding by exponential Golomb binarization using the optimal threshold, is output. The determined optimal threshold may be transmitted together with the output bit stream.

Figure 11:
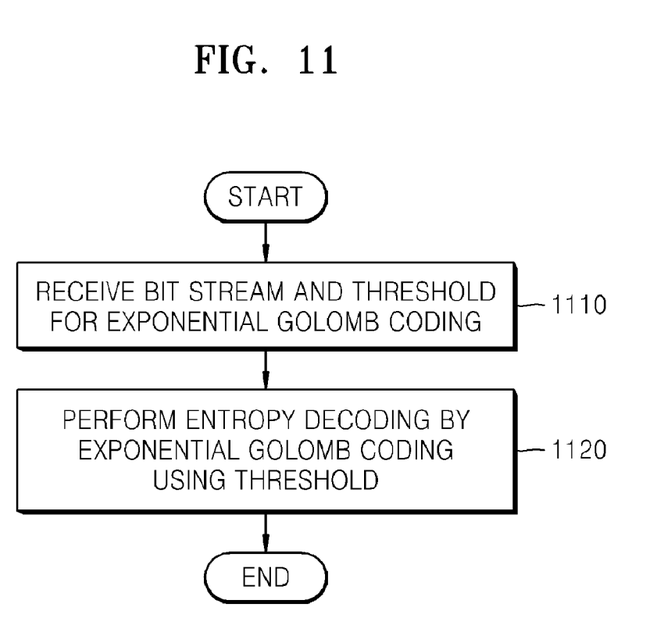
FIG. 11 is a flowchart illustrating an image decoding method according to an exemplary embodiment of the present invention.

FIG. 11 is a flowchart illustrating an image decoding method according to an exemplary embodiment of the present invention.

In operation 1110, the threshold for the exponential Golomb binarization is received together with the image bit stream.

In operation 1120, entropy decoding is performed by using the exponential Golomb binarization using the received threshold.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of encoding an image using exponential Golomb coding, the method comprising:
   performing entropy coding on an input image by exponential Golomb binarization using a plurality of predetermined thresholds;
   measuring a bit rate of each of a plurality of bit streams which are generated by performing the entropy coding using each of the plurality of predetermined thresholds; and
   determining an optimal threshold for exponential Golomb binarization by comparing the bit rates of the plurality of bit streams generated with regard to the plurality of predetermined thresholds
   wherein thresholds with regard to data of at least one of formats including luma, chroma, an intra mode, and an inter mode which are respectively adaptive to data may be determined based on the corresponding data format.

2. The method of claim 1, further comprising:
   outputting a bit stream which is generated by performing the entropy coding by exponential Golomb binarization using the determined optimal threshold.

3. The method of claim 2, further comprising:
   transmitting the determined optimal threshold together with the output bit stream.

4. The method of claim 1, wherein the determining the optimal threshold comprises determining a threshold which has a smallest bit rate from among the plurality of predetermined thresholds when a same quantization parameter is applied, and the thresholds are determined for individual frames or individual blocks in each individual frame.

5. The method of claim 1, wherein the optimal threshold is applied to data of at least one of formats including luma, chroma, intra mode, and inter mode.

6. The method of claim 1, wherein the performing the entropy coding includes binarization, context modeling and binary arithmetic coding, and the input image is an absolute value of a quantized value from a discrete cosine transformation coefficient of the input image.

7. An apparatus for encoding an image by using exponential Golomb coding, the apparatus comprising:
   a circular coding unit which performs entropy coding on an input image by performing exponential Golomb binarization using a plurality of predetermined thresholds;

a bit rate measuring unit which measures a bit rate of each of a plurality of bit streams generated by performing the entropy coding using each of the plurality of predetermined thresholds; and an optimal threshold determining unit which determines an optimal threshold for exponential Golomb binarization by comparing the bit rates of the plurality of bit streams generated with regard to the plurality of predetermined thresholds, wherein at least one of the circular coding unit, bit rate measuring unit and optimal threshold determining unit is implemented as a hardware component wherein thresholds with regard to data of at least one of formats including luma, chroma, an intra mode, and an inter mode which are respectively adaptive to data may be determined based on the corresponding data format.

8. The apparatus of claim 7, further comprising:

a bit stream output unit which outputs a bit stream generated by performing the entropy coding by exponential Golomb binarization using the determined optimal threshold.

9. The apparatus of claim 8, further comprising:

a threshold transmitting unit which transmits the determined optimal threshold together with the output bit stream.

10. The apparatus of claim 7, wherein the optimal threshold determining unit determines a threshold which has a smallest bit rate from among the plurality of predetermined thresholds when a same quantization parameter is applied, and the threshold is determined for individual frames or individual blocks in each individual frame.

11. The apparatus of claim 7, wherein the optimal threshold is applied to data of at least one of formats including luma, chroma, intra mode, and inter mode.

12. The apparatus of claim 7, wherein the entropy coding comprises binarization, context modeling and binary arithmetic coding, and the input image is an absolute value of a quantized DCT coefficient of the input image.

13. A method of decoding an image by entropy decoding by performing exponential Golomb binarization using a plurality of predetermined thresholds, the method comprising:

receiving threshold information for exponential Golomb binarization, together with an image bit stream; and performing entropy decoding by using exponential Golomb coding using the received threshold information, wherein the received threshold information comprises an optimal threshold which is used for entropy coding an input image using exponential Golomb binarization to code the image bit stream wherein the optimal threshold is determined by comparing bit rates of a plurality of bit streams generated with regard to the plurality of predetermined thresholds, and wherein thresholds with regard to data of at least one of formats including luma, chroma, an intra mode, and an inter mode which are respectively adaptive to data may be determined based on the corresponding data format.

14. The method of claim 13, wherein in the performing of the entropy decoding, thresholds which correspond to individual frames or individual blocks in each individual frame are used.

15. An apparatus for decoding an image by entropy decoding by performing exponential Golomb binarization using a plurality of predetermined thresholds, the apparatus comprising:

a receiving unit which receives threshold information for exponential Golomb binarization together with an image bit stream; and an entropy decoding unit which performs entropy decoding by using exponential Golomb binarization which uses the threshold information, wherein the threshold information includes an optimal threshold which is used for entropy coding an input image using exponential Golomb binarization to code the image bit stream and the optimal threshold is determined by comparing bit rates of a plurality of bit streams generated with regard to the plurality of predetermined thresholds, wherein at least one of the receiving unit and the entropy decoding unit is implemented as a hardware component, and wherein thresholds with regard to data of at least one of formats including luma, chroma, an intra mode, and an inter mode which are respectively adaptive to data may be determined based on the corresponding data format.

16. A non-transitory computer readable recording medium having embodied thereon a computer program for executing a method of encoding an image using exponential Golomb coding, the method comprising:

performing entropy coding on an input image by exponential Golomb binarization using a plurality of predetermined thresholds;

measuring a bit rate of each of a plurality of bit streams which are generated by performing the entropy coding using each of the plurality of predetermined thresholds; and determining an optimal threshold for exponential Golomb binarization by comparing the bit rates of the plurality of bit streams generated with regard to the plurality of predetermined thresholds, wherein thresholds with regard to data of at least one of formats including luma, chroma, an intra mode, and an inter mode which are respectively adaptive to data may be determined based on the corresponding data format.

17. A non-transitory computer readable recording medium having embodied thereon a computer program for executing a method of decoding an image by entropy decoding by performing exponential Golomb binarization using a plurality of predetermined thresholds, the method comprising:

receiving threshold information for exponential Golomb binarization, together with an image bit stream; and performing entropy decoding by using exponential Golomb coding using the received threshold information, wherein the received threshold information comprises an optima threshold which is used for entropy coding an input image using exponential Golomb binarization to code the image bit stream, the optimal threshold being determined by comparing bit rates of a plurality of bit streams generated with regard to the plurality of predetermined thresholds, and wherein thresholds with regard to data of at least one of formats including luma, chroma, an intra mode, and an inter mode which are respectively adaptive to data may be determined based on the corresponding data format.

* * * * *